US007339297B2

(12) United States Patent
Fischer

(10) Patent No.: US 7,339,297 B2
(45) Date of Patent: Mar. 4, 2008

(54) DRIVE FOR AN ELEVATOR INSTALLATION WITH INTEGRATED SENSOR

(75) Inventor: Daniel Fischer, Ollon/VD (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 11/146,962

(22) Filed: Jun. 7, 2005

(65) Prior Publication Data

US 2006/0042881 A1 Mar. 2, 2006

(30) Foreign Application Priority Data

Jun. 19, 2004 (EP) ................................ 040114439

(51) Int. Cl.
*H02K 11/00* (2006.01)

(52) U.S. Cl. .................................................... 310/68 B

(58) Field of Classification Search .............. 310/68 B, 310/261; 187/289, 393
See application file for complete search history.

(56) References Cited

U.S. PATENT DOCUMENTS

| | | | | |
|---|---|---|---|---|
| 4,308,462 | A * | 12/1981 | McMillen | 290/38 R |
| 4,389,586 | A * | 6/1983 | Foster et al. | 310/67 R |
| 4,605,853 | A * | 8/1986 | Kumada et al. | 250/231.14 |
| 5,179,307 | A * | 1/1993 | Porter | 310/68 B |
| 5,223,679 | A | 6/1993 | Yoo | |
| 5,977,671 | A * | 11/1999 | Kim | 310/89 |
| 6,011,388 | A * | 1/2000 | Miyazaki et al. | 324/174 |
| 6,169,345 | B1 * | 1/2001 | Bloch et al. | 310/67 R |
| 6,213,147 | B1 * | 4/2001 | Gramann et al. | 137/554 |
| 6,215,213 | B1 * | 4/2001 | Forster et al. | 310/78 |
| 6,225,715 | B1 * | 5/2001 | Hoda et al. | 310/67 R |
| 6,371,248 | B1 | 4/2002 | Cholinski | |
| 6,715,368 | B1 * | 4/2004 | Toratani et al. | 73/862.325 |
| 2003/0102749 | A1 * | 6/2003 | Kuch et al. | 310/91 |
| 2003/0218392 | A1 * | 11/2003 | Frey et al. | 310/68 B |
| 2004/0104079 | A1 * | 6/2004 | Fischer | 187/254 |

FOREIGN PATENT DOCUMENTS

| | | |
|---|---|---|
| EP | 1 074 505 | 2/2001 |
| EP | 1 146 005 | 10/2001 |
| EP | 1 400 477 | 3/2004 |

* cited by examiner

*Primary Examiner*—Thanh Lam
(74) *Attorney, Agent, or Firm*—Fraser Clemens Martin & Miller LLC; William J. Clemens

(57) ABSTRACT

A drive for an elevator installation which drives a car and a counterweight with supporting and driving belts includes a drive shaft and a drive pulley. A motor is arranged at either side of the drive pulley and is equipped with a signal transmitter. An inner ring of a motor bearing has a rotating part of the signal transmitter and the drive shaft coupled thereto.

23 Claims, 2 Drawing Sheets

DRIVE FOR AN ELEVATOR INSTALLATION WITH INTEGRATED SENSOR

BACKGROUND OF THE INVENTION

The present invention relates to a drive for an elevator installation.

An elevator installation consists of a car for reception of goods or persons to be transported and a counterweight, or a second car, which are connected together by way of supporting and driving means via a drive. The drive of the elevator installation in that case has the object of driving the driving and supporting means and thus an alternate raising and lowering of the car and the counterweight.

The drive consists of the principal components of a drive pulley, a motor and a brake. The drive pulley receives the supporting and driving means and transmits drive forces to the supporting and driving means by way of a mechanically positive or friction couple. The motor for its part drives the drive pulley, and the brake brakes the drive pulley. The motor, the brake and the drive pulley are accordingly connected together in terms of force and torque.

A drive for an elevator is shown in the European patent document EP 1 400 477 in which a motor drives drive pulleys by means of a drive shaft and the drive pulleys are braked by a brake. The drive pulleys are in that case, in a preferred form of embodiment, arranged between the motor and the brake unit. The drive pulleys drive flat belts. This allows use of small drive pulley diameters. The drive can thereby be of small and compact construction. Drives of this kind usually require a signal transmitter. The signal transmitter detects the rotational movement of the drive shaft and thus enables a speed or position determination of the moving bodies. Commercially available signal transmitters contain a rotating part, which has a readable mark or a coding and which is connected with the drive shaft, and a stationary part, which contains a reading device in order to read the mark or coding. The markings are, for example, of an inductive, magnetic or optical kind. In a common arrangement, the signal transmitter is fastened to an extended end of the drive shaft.

However, this attachment of a signal transmitter contains disadvantages. The attachment needs space and requires a precise and thus costly production.

SUMMARY OF THE INVENTION

An object of the present invention is to provide a drive for an elevator installation that solves the problems mentioned above. An economic attachment of a signal transmitter is provided and the drive as a whole has small external dimensions.

The present invention relates to a drive for an elevator installation, which drives a car and a counterweight by way of supporting and driving means. The drive comprises a drive pulley, which is driven by a motor by way of a drive shaft and is braked by a brake, wherein the drive shaft, the motor and the brake are combined with a support to form a unit. The support forms the common supporting structure of the drive at which, depending on the respective mode of construction, parts of the drive are arranged. It enables fastening of the drive in the building. The support can in that case be an integral component of the motor or the brake or it can be a housing which, for example, receives bearing points of the drive or encloses the drive pulleys.

In an embodiment according to the present invention the motor contains a bearing, the inner ring of which receives a motor shaft and at the same time contains or receives a mark or a coding for the signal transmitter. The use of the inner ring of the bearing for guidance of the motor shaft and at the same time for reception or arrangement of the marks or the coding of the signal transmitter enables an economic, space-saving and precise integration of the signal transmitter in a drive for an elevator.

Advantageously the mark or the coding is mounted on a rotating part, integrated therein or connected therewith, wherein the rotating part at the same time fixes the inner ring of the bearing. A separate fastening of the bearing is thereby redundant. This enables a reduction in the number of necessary parts and thus reduces the costs of the drive.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
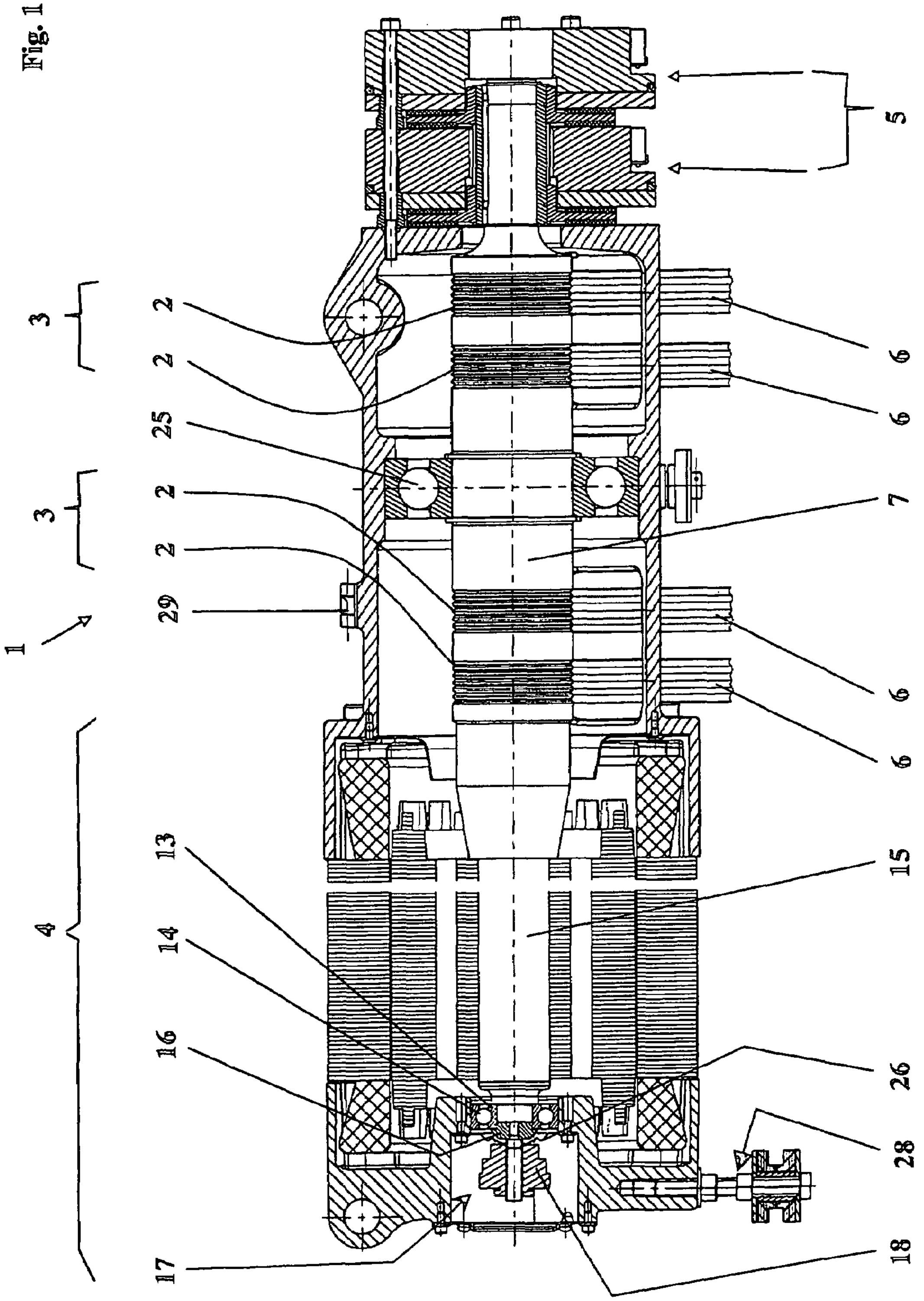
FIG. 1 is a cross-sectional view of a drive constructed in accordance with the present invention.

FIG. 1 shows a drive 1 for an elevator installation with the main characteristics of the present invention. The drive 1 consists of one or more drive pulley zones 3 that each has at least one drive pulley 2. The drive pulley 2 serves for reception of a supporting and driving means 6 which connects a car of the elevator installation with a counterweight or a second car. The drive pulley 2 is, in the case of the illustrated drive 1, integrated in a drive shaft 7. A motor 4 driving the drive shaft 7 is arranged in an adjoining manner at the drive pulley 2.

Figure 2:
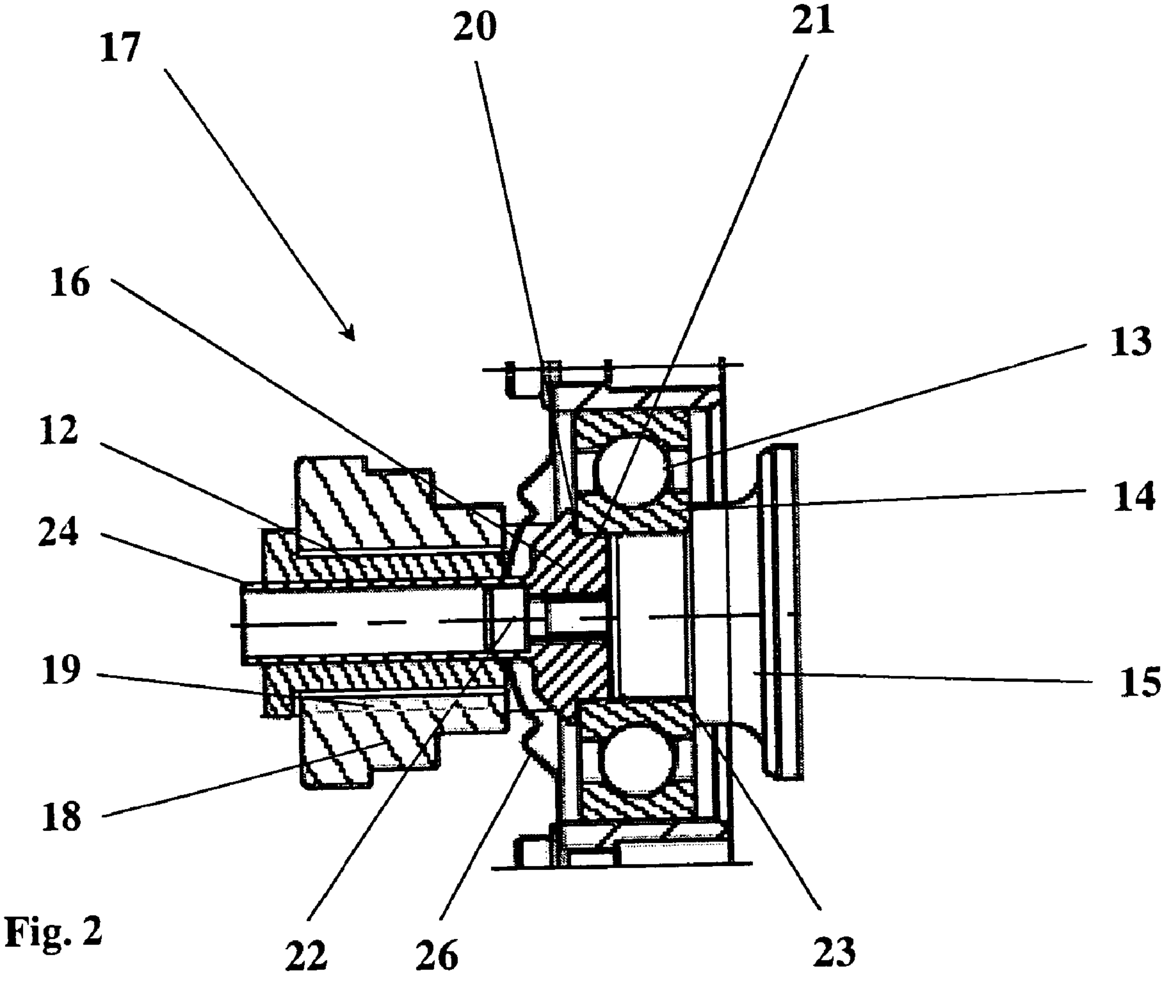
FIG. 2 is an enlarged view of a signal transmitter in the drive shown in FIG. 1.

The embodiment of the drive 1 according to the present invention for an elevator includes in the motor 4 a signal transmitter 17, wherein the signal transmitter 17 is arranged, as illustrated in FIG. 1 and FIG. 2 at an end of the motor 4 opposite the drive pulleys 2. The signal transmitter 17 consists of at least one mark 12 arranged at a rotating part and a reading head 19 mounted at a stationary part 18. The mark 12 can be of an inductive, magnetic or optical kind. The reading head 19 reads the mark 12 and makes available, for example, a frequency of rotation as digital information. The motor 4 moreover contains a bearing 13, an inner ring 14 of which receives a motor shaft 15 and at the same time the mark 12. The mark 12 is mounted either directly at the inner ring 14 or at a rotating part 16 connected with the inner ring 14. In the illustrated example according to FIG. 2 the rotating part 16 is pushed into the inner ring 14 and screw-connected with the motor shaft 15 by means of a screw 22. The rotating part 16 fixes the inner ring 14 of the bearing 13 on the motor shaft 15. The rotating part 16 in that case has at one end a cylindrical projection 24 at which the mark 12 is mounted. A cylinder 21 and a collar 20 adjoining the cylinder 21 are arranged at the other end of the rotating part 16. The cylinder 21 is pushed into the inner ring 14 of the bearing 13, wherein the depth of pushing-in is defined by the collar 20. The depth of penetration is small so as not to substantially influence the transmission of supporting force from the bearing 13 to the motor shaft 15. The depth of penetration of the cylinder 21 into the inner ring 14 is preferably less than ⅓ of the width of the inner ring. In the illustrated example the bearing 13 is clamped by means of the collar 20 on the motor shaft 15 in that the inner ring 14 of the bearing 13 is pressed against a shoulder 23 of the motor shaft 15.

This solution allows an economic, space-saving and precise arrangement of the signal transmitter 17 in the drive 1. Assembly of the drive 1 is possible in simple manner.

The stationary part of the signal transmitter 17 is preferably fastened in the housing of the motor 4 by means of a spring plate 26. The signal transmitter 17 can thus be retained in its position by a small force and it can at the same time deviate in the case of contact. This can be required if the rotating part 16 of the signal transmitter 17 rotates not absolutely centrically.

As illustrated in FIGS. 1 and 2, the drive 1 in a preferred embodiment consists of two mutually spaced-apart drive zones 3, wherein the drive zone 3 can contain one or more of the drive pulleys 2. The motor 4 and/or a brake 5 is or are arranged outside the two drive zones 3 and a main bearing 25 is arranged between the two drive zones 3, so that a main supporting force of the carrying force, which is produced by the supporting and driving belts 6, is substantially introduced into a supporting structure by means of the main bearing 25. A direct and optimum introduction of the supporting forces of the drive 1 into a supporting structure is thus made possible. The drive can thereby be of compact construction and realized economically.

The use of belts as the supporting and driving means 6 is particularly advantageous. The supporting and driving belts 6 allow use of small drive pulley diameters. A drive 1 with correspondingly high rotational speeds and low torques can thereby be used, which in turn permits use of drives with small dimensions. The belts in that case are, in correspondence with the construction of the drive pulley 2, flat, i.e. smooth, or they have a longitudinal profiling, for example in the form of wedge ribs, or they have a transverse profile, for example a tooth shape.

In the illustrated example of FIG. 1 the motor shaft 15, the drive shaft 7 and the drive pulley 2 are of integral construction. Alternatively, merely the motor shaft 15 and the drive shaft 7 can be of integral construction, or the drive shaft 7 and the drive pulley 2 are made from one piece. Production as individual separate parts is obviously also possible. Selection of the suitable form of embodiment is carried out according to the choice of the manufacturer.

An advantageous embodiment of the drive 1 arranges a level setting means 28 at the drive 1. The level setting means 28 accepts forces which arise due to asymmetrically introduced supporting means forces. Ideally this level setting means 28 is mounted in the vicinity of the support bearing 13. The drive 1 can be leveled in simple mode and manner by the settable level setting means 28. A spirit level 29 mounted in the housing of the drive 1 in that case facilitates checking of the setting. The arrangement of the support bearing 13 at the end, which is at the motor side, of the drive shaft 7 or of the motor shaft 15 enables an optimum introduction of supporting forces into the building. The bearing 13 thus serves for precise guidance of the signal transmitter 17, takes over the support forces which arise due to asymmetrical introduction of force at a main bearing 25 and introduces these forces preferably directly by way of the level setting means into the support structure or into the building.

The illustrated forms of embodiment are examples. Combinations are possible. Thus, for example, the signal transmitter 17 can be arranged at either end of a shaft, as in the case of a deflecting roller or a speed limiter with appropriate bearing construction, or the inner ring 14 and the rotating part 16 of the signal transmitter 17 can be of integral construction.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A drive for an elevator installation which drives a car and a counterweight by way of a supporting and driving means comprising:
- a drive shaft;
- a drive pulley coupled to said drive shaft for engaging the supporting and driving means;
- a motor having a motor shaft coupled at one end to said drive shaft for rotating said drive pulley;
- a bearing having an inner ring receiving said motor shaft, said inner ring carrying a mark, wherein said mark is attached directly to said inner ring; and
- a signal transmitter for sensing said mark as said inner ring is rotated by said motor shaft.

2. The drive according to claim 1 wherein said signal transmitter has a stationary part connected with the drive by a spring plate.

3. The drive according to claim 1 wherein the drive has at least two mutually spaced-apart drive zones each with at least one of said drive pulley and a main bearing arranged between said at least two drive zones.

4. The drive according to claim 3 wherein said motor is arranged outside said at least two drive zones.

5. The drive according to claim 3 including a brake coupled to said drive shaft and being arranged outside said at least two drive zones.

6. The drive according to claim 1 wherein the supporting and driving means is a belt and a traction surface of said drive pulley is one of flat, longitudinally profiled or transversely profiled.

7. The drive according to claim 1 wherein said motor has a motor shaft integral with said drive shaft.

8. The drive according to claim 7 wherein said drive shaft and said drive pulley are of integral construction.

9. The drive according to claim 1 wherein said drive shaft and said drive pulley are of integral construction.

10. A drive for an elevator installation which drives a car and a counterweight by way of a supporting and driving means comprising:
- a drive shaft;
- at least two drive pulleys coupled to said drive shaft for engaging the supporting and driving means;
- a motor having a motor shaft coupled at one end to said drive shaft for rotating said drive pulleys;
- a bearing having an inner ring receiving said motor shaft, said inner ring carrying a mark, wherein said mark is attached to said inner ring by a rotating part that fixes said inner ring on said motor shaft; and
- a signal transmitter for sensing said mark as said inner ring is rotated by said motor shaft.

11. The drive according to claim 10 wherein said rotating part is pushed into said inner ring and attached to said motor shaft by a fastener.

12. The drive according to claim 10 wherein said rotating part has a cylindrical projection on which said mark is carried.

13. The drive according to claim 10 including a cylinder pushed into said inner ring and a collar limiting a depth of the pushing-in of said cylinder.

14. The drive according to claim 13 wherein the depth of the pushing-in of said cylinder is less than ⅓ of a width of said inner ring.

15. The drive according to claim 10 wherein said motor shaft has a shoulder and said inner ring is pressed against said shoulder.

16. The drive according to claim 10 wherein said signal transmitter has a stationary part connected with the drive by a spring plate.

17. A drive for an elevator installation which drives a car and a counterweight by way of a supporting and driving means comprising:

a drive shaft;

a drive pulley coupled to said drive shaft for engaging the supporting and driving means;

a motor having a motor shaft coupled at one end to said drive shaft for rotating said drive pulley;

a bearing having an inner ring receiving said motor shaft, said inner ring carrying a mark, wherein said mark is attached to said inner ring by a rotating part that fixes said inner ring on said motor shaft; and a signal transmitter for sensing said mark as said inner ring is rotated by said motor shaft.

18. The drive according to claim 17 wherein said rotating part is pushed into said inner ring and attached to said motor shaft by a fastener.

19. The drive according to claim 17 wherein said rotating part has a cylindrical projection on which said mark is carried.

20. The drive according to claim 17 including a cylinder pushed into said inner ring and a collar limiting a depth of the pushing-in of said cylinder.

21. The drive according to claim 20 wherein the depth of the pushing-in of said cylinder is less than ⅓ of a width of said inner ring.

22. The drive according to claim 17 wherein said motor shaft has a shoulder and said inner ring is pressed against said shoulder.

23. The drive according to claim 17 wherein said signal transmitter has a stationary part connected with the drive by a spring plate.

* * * * *